United States Patent
Wuebker et al.

(10) Patent No.: US 10,878,201 B1
(45) Date of Patent: Dec. 29, 2020

(54) APPARATUS AND METHOD FOR AN ADAPTIVE NEURAL MACHINE TRANSLATION SYSTEM

(71) Applicant: Lilt, Inc., Stanford, CA (US)

(72) Inventors: Joern Wuebker, Stanford, CA (US); Patrick Simianer, Stanford, CA (US); Spence Green, Stanford, CA (US)

(73) Assignee: Lilt, Inc., Stanford, CA (US)

( * ) Notice: Subject to any disclaimer, the term of this patent is extended or adjusted under 35 U.S.C. 154(b) by 237 days.

(21) Appl. No.: 16/047,669

(22) Filed: Jul. 27, 2018

Related U.S. Application Data

(60) Provisional application No. 62/537,891, filed on Jul. 27, 2017.

(51) Int. Cl.
*G06F 40/58* (2020.01)
(52) U.S. Cl.
CPC .................... *G06F 40/58* (2020.01)
(58) Field of Classification Search
CPC ...... G10L 15/1815; G10L 15/01; G06F 40/58
See application file for complete search history.

(56) References Cited

U.S. PATENT DOCUMENTS

| | | | | |
|---|---|---|---|---|
| 8,380,486 B2* | 2/2013 | Soricut | .................... | G06F 40/58 704/2 |
| 2002/0032549 A1* | 3/2002 | Axelrod | .................. | G10L 15/01 703/2 |
| 2007/0271088 A1* | 11/2007 | Waibel | .................... | G06F 40/58 704/9 |
| 2009/0281789 A1* | 11/2009 | Waibel | .................... | G06F 40/40 704/3 |
| 2011/0082683 A1* | 4/2011 | Soricut | .................. | G06F 40/58 704/2 |
| 2016/0140111 A1* | 5/2016 | Mirkin | .................... | G06F 40/44 704/2 |
| 2018/0075343 A1* | 3/2018 | van den Oord | ...... | G06N 3/0472 |

* cited by examiner

*Primary Examiner* — Feng-Tzer Tzeng
(74) *Attorney, Agent, or Firm* — Cooley LLP

(57) ABSTRACT

An apparatus has a network interface circuit to receive a source sentence from a network connected client device. A processor is connected to the network interface circuit. A memory is connected to the processor. The memory stores parameters of a neural machine translation system and instructions executed by the processor to operate the neural machine translation system trained on a corpus of source sentences and corresponding target sentences. The neural machine translation system is trained to predict a target sentence from a source sentence. A translation hypothesis is formed for the source sentence to form the target sentence. The target sentence is supplied to the network connected client device. A correct translation is received from the network connected client device. Parameters of the neural machine translation system are updated based upon the correct translation.

5 Claims, 4 Drawing Sheets

APPARATUS AND METHOD FOR AN ADAPTIVE NEURAL MACHINE TRANSLATION SYSTEM

CROSS-REFERENCE TO RELATED APPLICATION

This application claims priority to U.S. Provisional Patent Application Ser. No. 62/537,891, filed Jul. 27, 2017, the contents of which are incorporated herein by reference.

FIELD OF THE INVENTION

This invention relates generally to automated translation from a source language to a target language. More particularly, this invention is directed toward adaptive neural machine translation.

BACKGROUND OF THE INVENTION

Various statistical techniques, such as neural networks, are used to translate sentences from a source language to a target language. There are ongoing needs to improve the accuracy and speed of such translations.

SUMMARY OF THE INVENTION

An apparatus has a network interface circuit to receive a source sentence from a network connected client device. A processor is connected to the network interface circuit. A memory is connected to the processor. The memory stores parameters of a neural machine translation system and instructions executed by the processor to operate the neural machine translation system trained on a corpus of source sentences and corresponding target sentences. The neural machine translation system is trained to predict a target sentence from a source sentence. A translation hypothesis is formed for the source sentence to form the target sentence. The target sentence is supplied to the network connected client device. A correct translation is received from the network connected client device. Parameters of the neural machine translation system are updated based upon the correct translation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
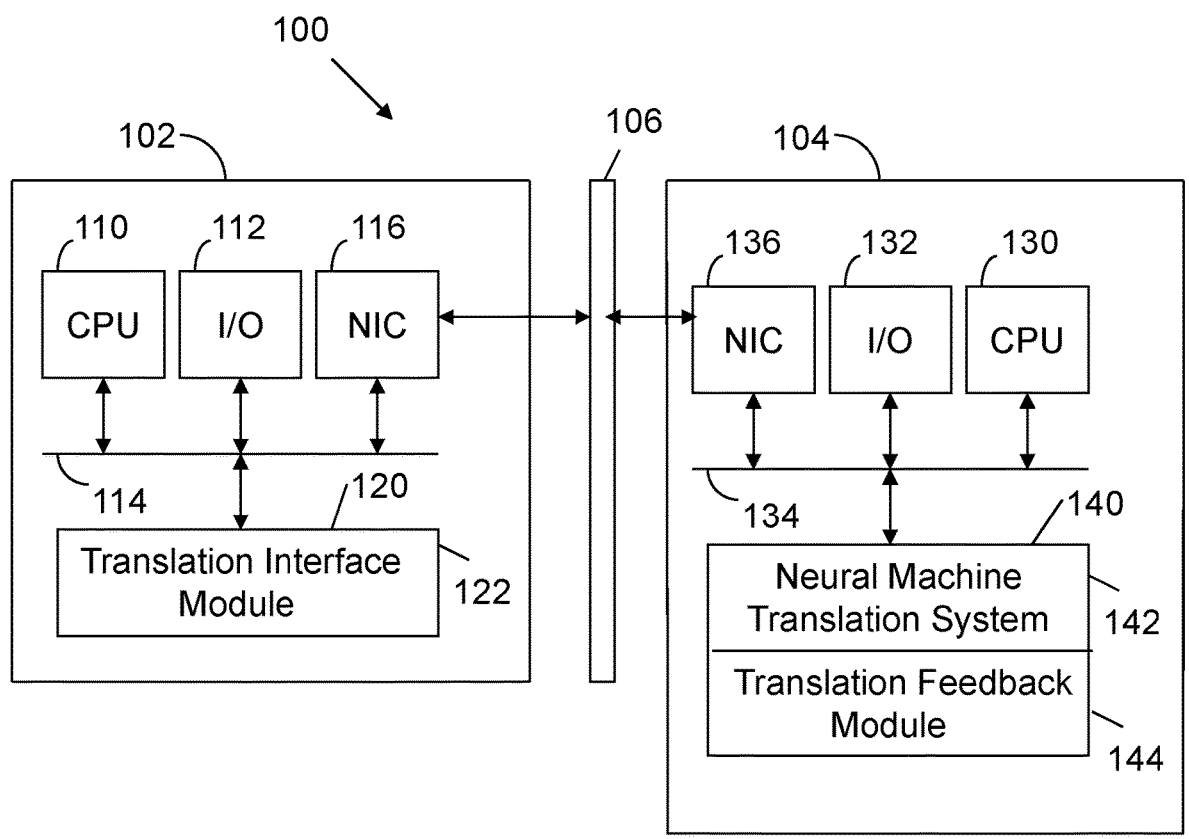
FIG. 1 illustrates a system configured in accordance with an embodiment of the invention.

FIG. 1 illustrates a system 100 configured in accordance with an embodiment of the invention. The system 100 includes a client device 102 in communication with a server 104 via a network 106, which may be any combination of wired and wireless networks. Client device 102 may be a computer, tablet, smartphone and the like. The client device 102 includes a processor (e.g., a Central Processing Unit or CPU) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory stores a translation interface module 122, which includes instructions executed by processor 110. The translation interface module 122 includes instructions to communicate with server 104 to obtain an interface that accepts source language sentences and corresponding target language translations. A source sentence is communicated to the server 104 to obtain a translation into the target language. A pair of a source sentence and corresponding target sentence, examples of which are discussed below, are communicated to the server 104 to provide adaptation examples. The translation interface module 122 also includes instructions executed by the processor 110 to display translations and other information about the system.

Server 104 includes a processor 130, input/output devices 132, a bus 134 and a network interface circuit 136. A memory 140 is connected to bus 134. The memory 140 stores instructions to implement operations associated with the invention. In particular, the memory 140 stores the parameters of a neural machine translation system 142, the operations of which are discussed in detail below. The memory 140 also stores a translation feedback module 144 with instructions executed by the processor 130 to communicate to the client device a translated sentence.

Figure 2:
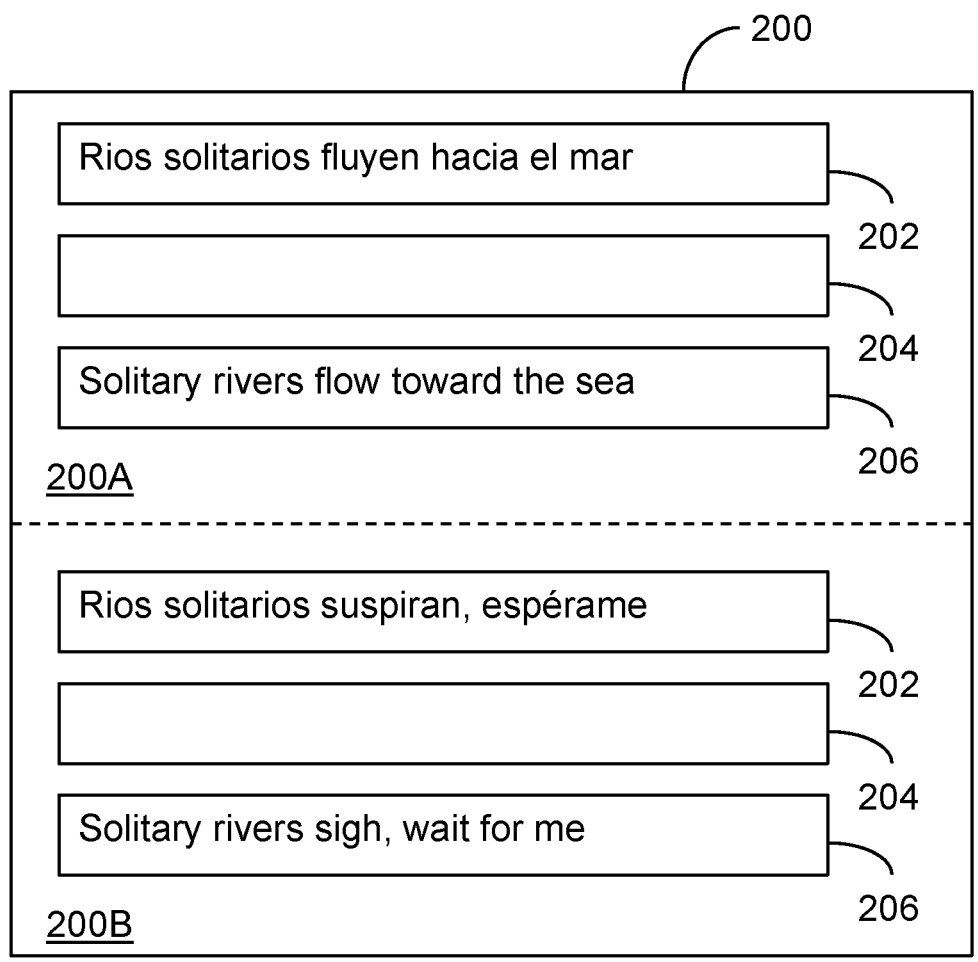
FIGS. 2-3 illustrate user interfaces that may be utilized in accordance with embodiments of the invention.

FIG. 2 illustrates an interface 200 that may be used in accordance with an embodiment of the invention. For example, the interface 200 is supplied by the server 104 for display on the client device 102. The interface 200 includes a text entry box 202 into which a user can type a source sentence, Spanish in this example, as well as a text entry box 204 into which a user can type a correct translation. The correct translation may be entered at the time that the source sentence is entered. Alternately, the correct translation may be entered after an unsatisfactory translation is received. Alternately, the correct translation may be entered after a satisfactory translation is received to supply an endorsement of the translation.

A translated text box 206 provides target language predictions, which are generated by the neural machine translation system's decoder. The neural machine translation system 144 populates the translated text box 206 with a translation in response to receiving the source sentence in the text entry box 202. When translating multiple sentences, each source sentence is entered into a different text entry box 202, each corresponding translation is entered into a corresponding text entry box 204, and a translation is provided by the neural machine translation system 144 in a corresponding translated text box 206. Examples 200A and 200B are shown.

Figure 3:
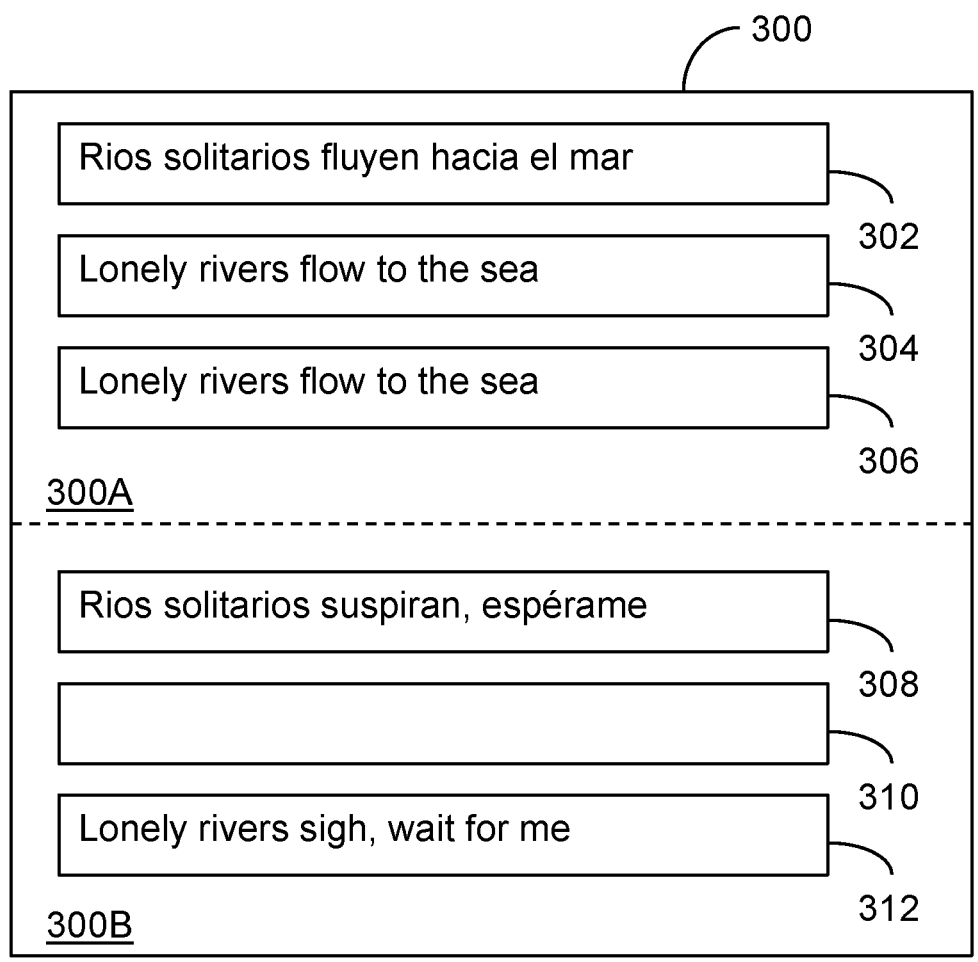

As shown with interface 300, when a translation is entered into text entry box 304, both the source sentence from text entry box 302 and a proposed translation in text entry box 304 are communicated as a pair to the neural machine translation system 144 so that its parameters can be updated to reflect this new translation example. In the example of section 300A of FIG. 3, the target translation 304 is confirmed, as shown in block 306. A revised translation has been requested for the second sentence 308. The translation for the second sentence reflects the use of vocabulary, linguistic structure, and style of the first sentence. As shown in block 312 of section 300B, the Spanish word "solitarios" is translated as "lonely" rather than "solitary" because of a related lexical choice in the translation of the first sentence.

Figure 4:
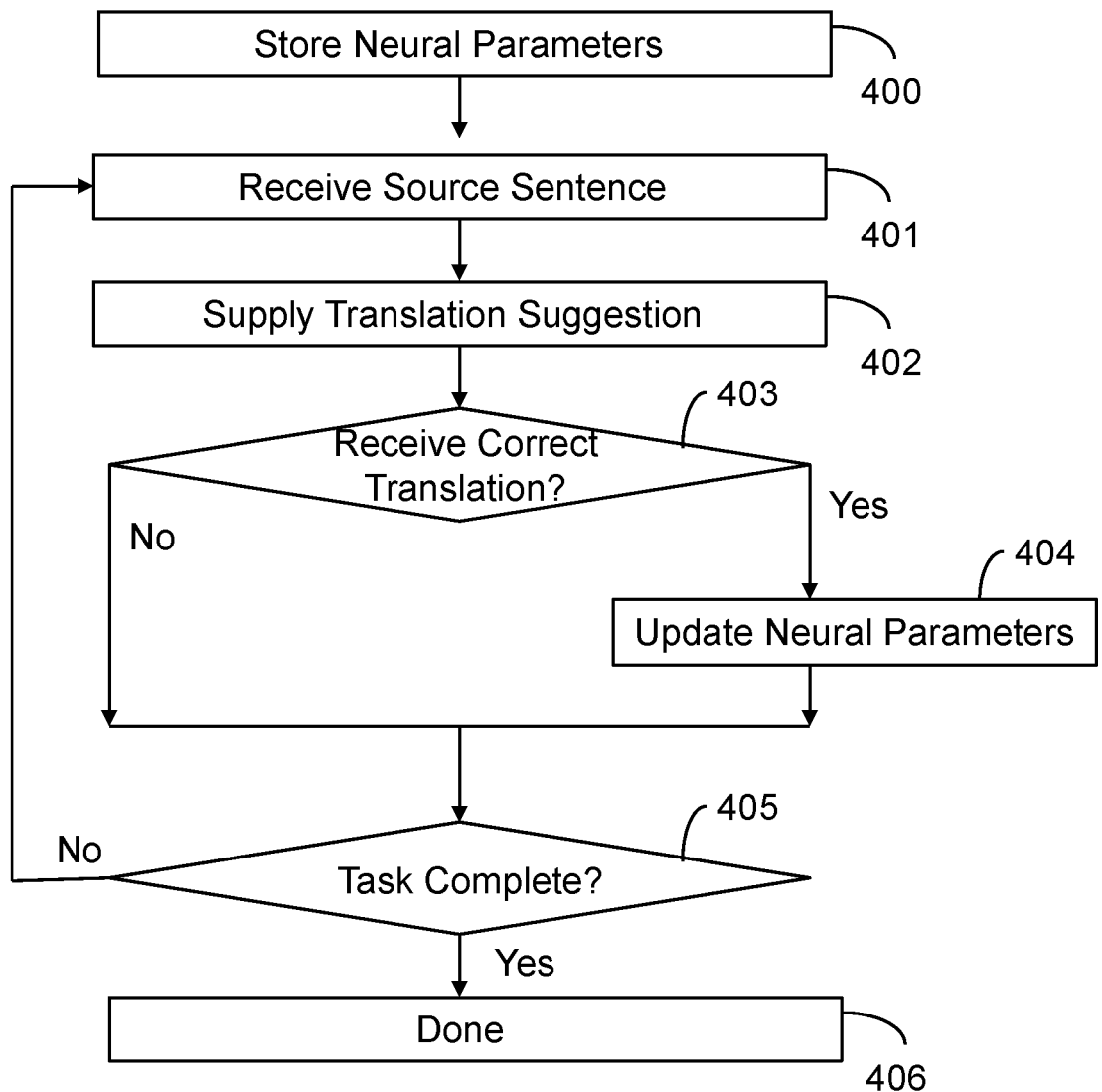
FIG. 4 illustrates processing operations performed in accordance with an embodiment of the invention.

FIG. 4 illustrates processing operations associated with an embodiment of the invention. Initially, parameters for a neural machine translation system are stored 400. FIG. 1 illustrates the neural machine translation system 142 stored in memory 140. Neural machine translation (NMT) is an approach to machine translation that uses a large neural network. It departs from phrase-based statistical translation approaches that use separately engineered subcomponents, which are then weighted either manually or according to an optimization criterion. In contrast, neural machine translation models use deep learning and representation learning. They may require less memory than traditional statistical machine translation models, since they do not require either a large target-side language model or a translation model that is proportional to the training data size. Furthermore, unlike conventional statistical machine translation systems, all parts of the neural translation model are trained jointly (end-to-end) to maximize the translation accuracy. A subnetwork, known as an encoder, is used by the neural network to encode a source sentence for a second subnetwork, known as a decoder, which is used to predict words in the target language. Recurrent, convolutional, self-attentive, or other neural network structures may be used for the encoder or decoder. Characteristics of the neural machine translation system are detailed below.

The next operation in FIG. 4 is to receive a source sentence 401. The neural machine translation system takes the source sentence, i.e. a sequence of source words $x=x_1 \ldots x_m$ and predicts the most likely target word sequence $y=y_1 \ldots y_k$ given the model parameters stored in memory 140 using an encoder function $f_{enc}$ and a decoder function $f_{dec}$, which are represented as subnetworks.

The encoder function transforms the input sequence into a sequence of hidden states in a real-valued embedded space: $f_{enc}(x)=h=h_1 \ldots h_m$.

The decoder function computes the probability of the output sequence y conditioned on the input sequence x according to the chain rule as a product of the probabilities of individual elements $y_i$ in the sequence. More particularly, the decoder function factorizes the probability of the target sequence as $f_{dec}(y, h)=p(y|x)=\Pi^k_{i=1} p(y<i, s_i, c_i)$ where $s_i$ is the decoder state at timestep i and $c_i$ is a context vector that is computed with an attention function $f_{att}$: $c_i=\Sigma_j a_{ij} h_j$, $a_{ij}=a'_{ij}/\Sigma_j a'_{ij}$, $a'_{ij}=f_{att}(s_i,h_j)$. Each context vector is a linear mixture of vectors representing source word positions.

To supply a translation suggestion 402, the server 104 sends the highest probability sequence y that it has found through the process of decoding under the neural machine translation system 142 over the network 106 to the client 100, which shows it as a translation prediction in the translated text box (e.g., 206).

In the event of a correct translation (403—Yes) the neural machine translation system updates its neural parameters 404. As discussed above, the correct translation may be received when the source sentence is received. Alternately, the correct translation may be entered after an unsatisfactory translation is received. Alternately, the correct translation may be entered after a satisfactory translation is received to supply an endorsement of the translation.

When a corrected translation is not received (403—No) and after neural parameters are updated 404, a check is made to determine whether the task is complete 405. If not (405—No), control returns to block 401 for processing of another source sentence. If so (405—Yes), processing is completed 406.

A neural machine translation system can be adapted to a new domain with a technique called fine tuning. A model which has been fully trained on general domain data serves as the starting point. Training continues in the same fashion on in-domain data. Training can either be performed in batch by leveraging an available domain-relevant bitext, or incrementally (an approach called online learning) by performing a model update after every segment that is translated by a human translator.

The model is defined by a set of parameters θ. In the batch approach to adaptation, the bitext is randomized and divided into mini-batches. On each mini-batch, the gradient $\nabla L(\theta)$ of a differentiable loss function $L(\bullet)$ with respect to the model parameters is computed. Typical loss functions are the maximum likelihood estimate or the cross-entropy loss. With the application of a gradient-based learning procedure, e.g. Adam (Kingma and Ba, 2014) or stochastic gradient descent (SGD), the model parameters are updated based on the gradient. In the following discussion, we will assume that SGD is used for parameter learning for simplicity, although our invention applies to any gradient-based optimization strategy. Given a learning rate q, the following update is performed: $\theta'=\theta-\eta\nabla L(\theta)$. The parameters of the model are changed in the direction of the gradient of the loss. The magnitude of this change is influenced by the learning rate η. This process is continued by using the updated model θ for the next mini-batch, until all in-domain data has been used as part of a training step one or more times.

In the incremental approach to adaptation, the NMT system performs an update on a single segment rather than a batch of multiple segments. For each segment pair (x; y), the learning system updates the model parameters as above. Any number of gradient-based parameter updates, from one to $i_{Max}$ updates, may be performed on a single segment. The number of updates can be determined by a model-based quantitative criterion, such as the model's perplexity (ppl) on the current segment. A perplexity of ppl(θ; x; y)=1 corresponds to the model having perfectly memorized the segment (x; y). The model is repeatedly updated until the perplexity falls below a threshold, such as 1.5, or the maximum number of updates $i_{Max}$ is reached. An appropriate value for $i_{Max}$ is 3.

The invention has been disclosed in the context of single sentence processing. Naturally, the techniques of the invention are equally applicable to the processing of batches of sentences.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a network interface circuit to receive a source sentence from a network connected client device;
a processor connected to the network interface circuit; and
a memory connected to the processor, the memory storing parameters of a neural machine translation system and instructions executed by the processor to:
operate the neural machine translation system trained on a corpus of source sentences and corresponding target sentences, wherein the neural machine translation system is trained to predict a target sentence from a source sentence,
form a translation hypothesis for the source sentence to form the target sentence,
supply the target sentence to the network connected client device,
receive from the network connected client device a correct translation, and
update the parameters of the neural machine translation system based upon the correct translation by computing a gradient of a loss function for the source sentence and the target sentence and using the gradient of the loss function to update the parameters of the neural machine translation system.

2. The apparatus of claim 1 wherein the memory stores instructions executed by the processor to compute the perplexity for a set of updated parameters of the neural machine translation system based upon the source sentence and the target sentence.

3. The apparatus of claim 2 wherein the memory stores instructions executed by the processor to determine a number of updates for the source sentence and the target sentence by comparing the perplexity with a threshold value.

4. The apparatus of claim 1 wherein the memory stores instructions executed by the processor to compute a context vector as a linear mixture of vectors representing source word positions.

5. The apparatus of claim 1 wherein the memory stores instructions executed by the processor to form a graphical user interface with a source sentence text entry area, a corrected translation text entry area and a target sentence display area.

* * * * *